(12) United States Patent
Luning et al.

(10) Patent No.: US 7,653,782 B2
(45) Date of Patent: Jan. 26, 2010

(54) METHOD FOR HOST BUS ADAPTER-BASED STORAGE PARTITIONING AND MAPPING ACROSS SHARED PHYSICAL DRIVES

(75) Inventors: Stephen G. Luning, Austin, TX (US); Rohit Chawla, Austin, TX (US); Gary Kotzur, Austin, TX (US); Ahmad H. Tawil, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 11/439,049

(22) Filed: May 23, 2006

(65) Prior Publication Data

US 2007/0276997 A1 Nov. 29, 2007

(51) Int. Cl.
*G06F 12/00* (2006.01)
(52) U.S. Cl. .................................. 711/114; 711/173
(58) Field of Classification Search ........................ None
See application file for complete search history.

(56) References Cited

U.S. PATENT DOCUMENTS

| | | | |
|---|---|---|---|
| 6,895,480 B2 | 5/2005 | Heil | |
| 7,281,167 B2 * | 10/2007 | Dube | 714/39 |
| 7,380,163 B2 * | 5/2008 | Davies et al. | 714/9 |
| 2003/0191908 A1* | 10/2003 | Cohn et al. | 711/153 |
| 2004/0153710 A1* | 8/2004 | Fair | 714/4 |
| 2005/0010838 A1* | 1/2005 | Davies et al. | 714/100 |
| 2006/0248379 A1* | 11/2006 | Jernigan | 714/6 |
| 2006/0265449 A1* | 11/2006 | Uemura et al. | 709/203 |
| 2007/0162592 A1 | 7/2007 | Marks et al. | |
| 2007/0174686 A1* | 7/2007 | Douglas et al. | 714/13 |
| 2007/0226533 A1* | 9/2007 | Hafner et al. | 714/6 |
| 2007/0266110 A1* | 11/2007 | Chawla et al. | 709/217 |

* cited by examiner

*Primary Examiner*—Jack A Lane
(74) *Attorney, Agent, or Firm*—Baker Botts L.L.P.

(57) ABSTRACT

A system for a host-based RAID solution in a shared storage environment is provided in which the compute blades of a system are coupled to one or multiple concentrators. The concentrators serve as a switch or expander to couple each of the compute blades to a shared storage resource. Within the shared storage resource, a set of drives is configured in a RAID array. The shared disk drives are partitioned so that each partition is dedicated to one of the compute blades of the system. Multiple sets of drives may be used so that the collective set of drives can be configured as part of a RAID volume that includes mirroring between at least two of the drives of the RAID volume, such as RAID 1 or RAID 0+1, in which each set of drives is a mirror of the other set of drives and the content associated with each of the compute blades is striped across multiple drives in each of the two sets of drives.

20 Claims, 4 Drawing Sheets

METHOD FOR HOST BUS ADAPTER-BASED STORAGE PARTITIONING AND MAPPING ACROSS SHARED PHYSICAL DRIVES

TECHNICAL FIELD

This invention relates generally to information handling systems and, more particularly, to a system for a host-based RAID solution in a shared storage environment.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

In conventional compute blade chassis designs, each compute blade has its own couple of local hard disk drives that are used for bootstrapping the operating system and/or local storage. These two local hard disk drives are typically mirrored using a host-based and/or an operating system-based RAID solution to provide fault tolerance. However, such a design impacts compute blade density, form factor, air flow, and thermal cooling, and, in addition, adds cost to the overall compute blade design. It is typical to include a minimum of two hard disk drives on each compute blade of the system. For example, assuming a compute blade configuration has ten compute blades, at least twenty local hard disk drives would be needed, a minimum of two per compute blade, to support the compute blade configuration.

SUMMARY OF THE INVENTION

A system for a host-based RAID solution in a shared storage environment is provided in which the compute blades of a system are coupled to one or multiple concentrators. The concentrators serve as a switch or expander to couple each of the compute blades to a shared storage resource. Within the shared storage resource, a set drives is configured in a RAID array. The shared disk drives are partitioned so that each partition is dedicated one of the compute blades of the system. Multiple sets of drives may be used so that the collective set of drives can be configured as part of a RAID 0+1 configuration in which each set of drives is a mirror of the other set of drives and the content associated with each of the compute blades is striped across multiple of the drives in each of the two sets of drives.

The system and method disclosed herein is advantageous because it results in the migration of local drives from each of the compute blades to a shared storage resource. Because the drives no longer reside on each of the compute blades, the compute blades benefit from design improvements related to the density, form factor, air flow, and thermal performance of the compute blades. In addition, the number of drives required for the system is reduced, as the compute blades of the system can share the drives of the shared storage resource. The system and method disclosed herein is also advantageous because the system provides for failure recovery in the event of a failure of a drive or a concentrator. If a drive or a concentrator fails, the RAID 0+1 configuration of the drives provides for fault tolerance, as data can be recovered through the surviving concentrator and the surviving mirror of the failed drive. In addition, the placement of the drives of each compute blade on the shared storage resources provides for a local RAID solution that is implemented on a shared storage resource. Other technical advantages will be apparent to those of ordinary skill in the art having the benefit of the present disclosure and in view of the following specification, claims, and drawings.

BRIEF DESCRIPTION OF THE DRAWINGS

The following figures form part of the present specification and are included to further demonstrate certain aspects of the present invention, and should not be used to limit or define the present invention. The present invention may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
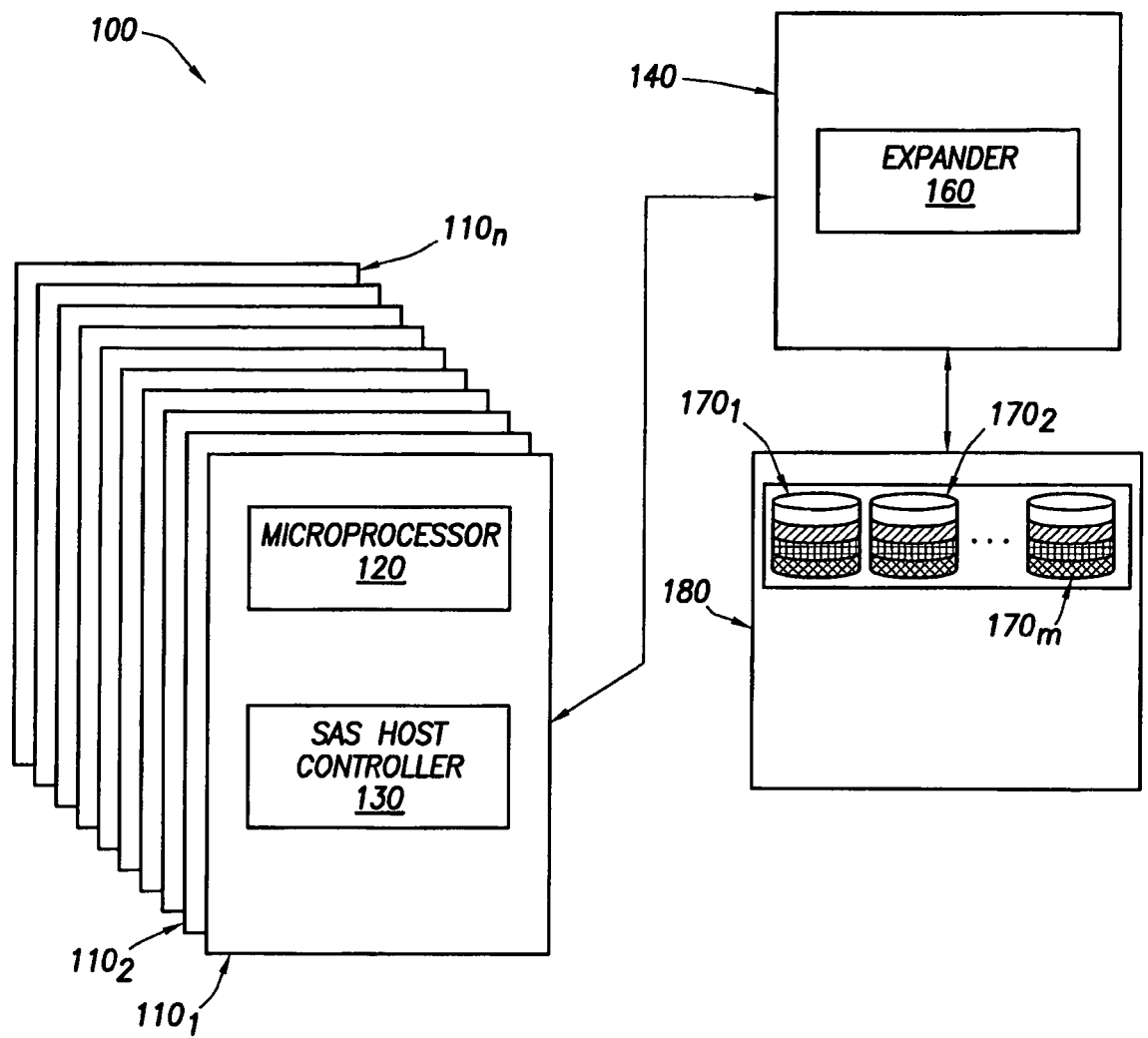
FIG. 1 is a diagram of a system for a host-based RAID solution in a shared storage environment that includes a single concentrator.

FIG. 1 is a diagram of a system 100 for a host-based RAID solution in a shared storage environment. System 100 includes a plurality of n compute blades identified at $110_1$ through $110_n$. Each of the plurality of compute blades 110 lacks a hard disk drive. System 100 includes a set of drives $170_1$ through $170_m$, which are included within a shared storage resource 180 and are configured according to a RAID storage methodology. Shared storage resource 180 may comprise a chassis or other storage enclosure. Shared storage resource 180 is coupled to a concentrator 140, which is a non-intelligent device that provides connectivity between the set of compute blades 110 and the drives 170. Concentrator 140 includes an expander 160. The function of the concentrator is to act as an expander to provide a communications link between the compute blades and the drives of the shared storage resource. Each of the compute blades 110 includes one or more microprocessors 120 and Serial Attached Small Computer System Interface (SAS) host controller 130. SAS host controller 130 includes RAID storage management software and storage partitioning software.

RAID storage management software is executed in SAS host controller 130 so that SAS host controller can manage the RAID-configured drives 170. As an alternative to executing the RAID storage management software as an application on the SAS host controller, the RAID storage management software of a blade computer could be included in the operating system or in the driver software of the blade. Drives 170 are logically separated into a number of partitions. As indicated in FIG. 1, the partitions are striped across one or more of drives 170, and each partition is associated with and controlled by one of the compute blades 110. The partitioning of the stripes across the disks is accomplished so that each stripe is dedicated to a blade and so that each blade does not interfere with data dedicated to another blade. Data can be distributed in partitions according to an incremental distribution scheme, although more complex schemes, such as those including look-up tables, could be employed.

Figure 2:
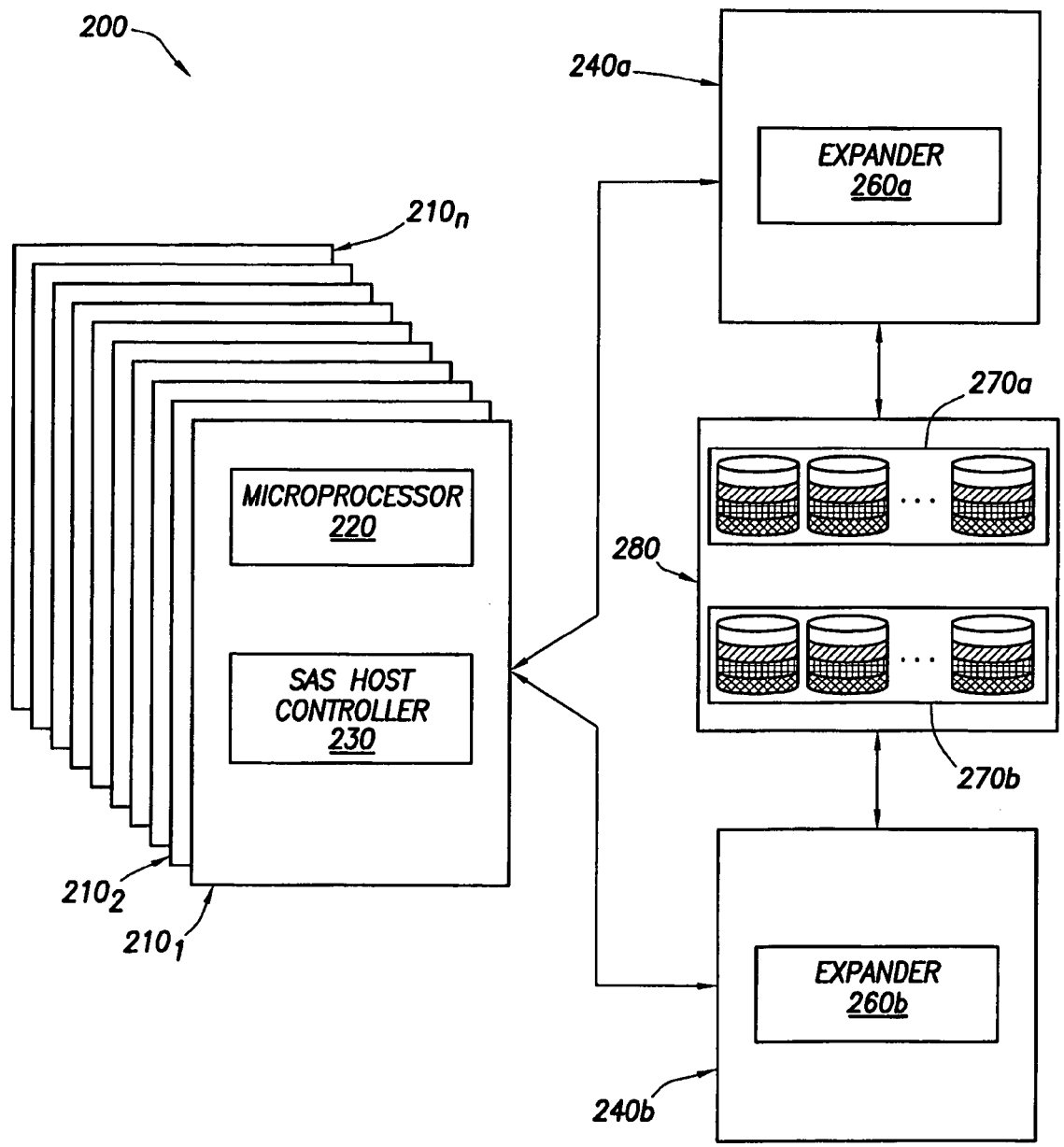
FIG. 2 is a diagram of a system for a host-based RAID solution in a shared storage environment that includes multiple concentrators.

FIG. 2 is a diagram of a system 200 for a host-based RAID solution in a shared storage environment. The operation and architecture of the system of FIG. 2 is similar to that of FIG. 1. System 100 includes a plurality of n compute blades identified at $210_1$, $210_2$ through $210_n$. Each of the plurality of compute blades 210 lacks a hard disk drive. Each of the compute blades includes a microprocessor 220 and an SAS host controller 230. In FIG. 2, however, each blade $210_1$ through $210_n$ is coupled to two concentrators. As indicated in FIG. 2, each blade is coupled to concentrator 240a and 240b. Each concentrator includes an expander 260.

In operation each blade is coupled to six drives, which are configured in a RAID 0+1 configuration. The drives are maintained in shared storage resource 280. A RAID 0+1 configuration is characterized by a set of drives that includes both mirroring between two subsets of the drives and striping across each of the subsets of drives. In the example of FIG. 2, one set of drives is included in the array of drives designated at 270a, and the other set of drives is included in the set of drives designated at 270b. As indicated in the hatching on the drives, the drives are partitioned, and each partition is associated with one of the blades 210. The stripe associated with each drive is mirrored across each of the arrays 270a and 270b. The system of FIG. 2 is fully redundant. If a concentrator or one of the arrays were to fail, the entire content of an array would be available to the blade on the surviving array. The concentrator itself is hot-swappable. If a concentrator were to fail, it could be replace by another concentrator without any negative affect on the ability of the compute blades to access data in the shared storage resource.

Figure 3:
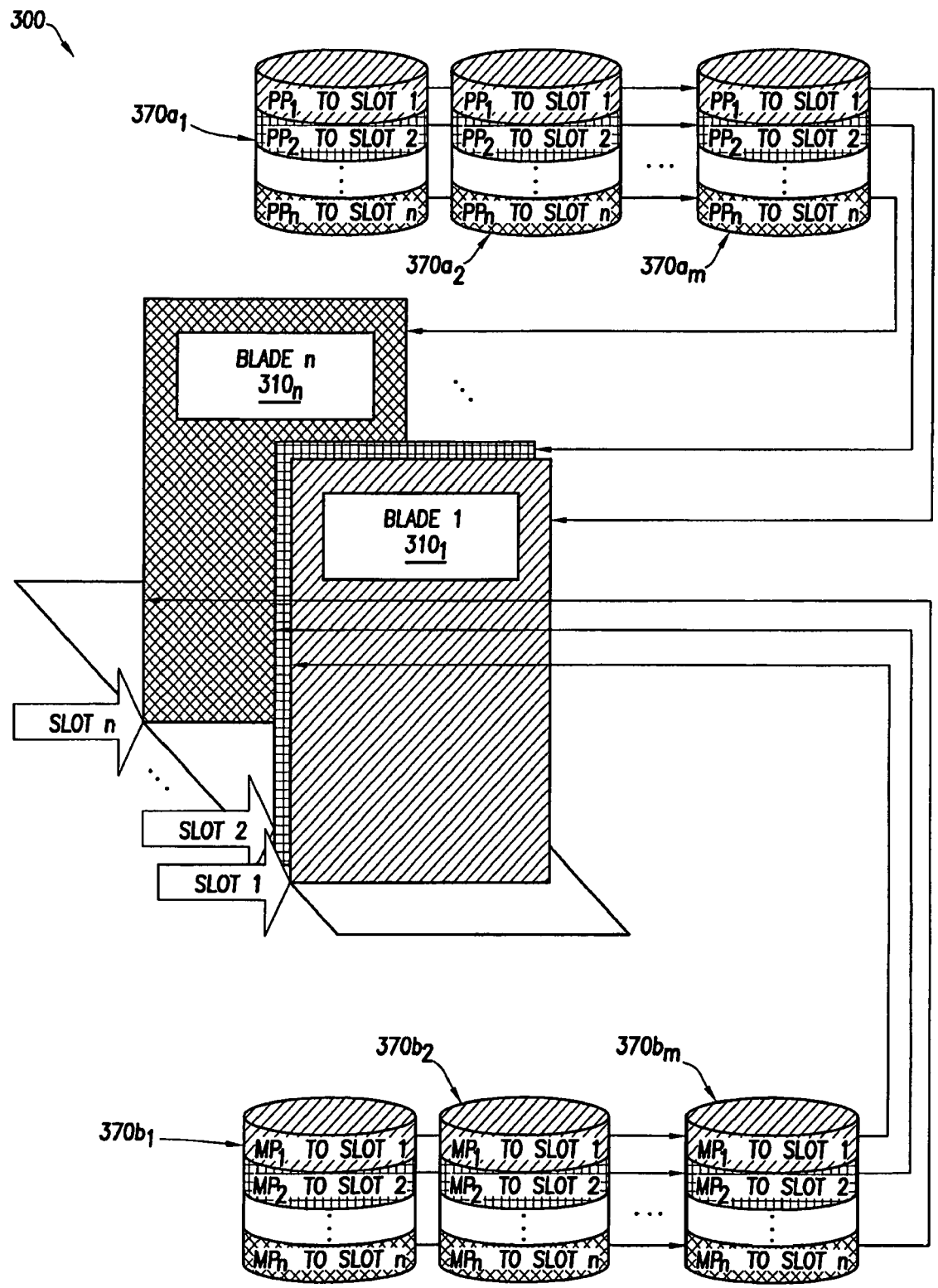
FIG. 3 is a diagram of the allocation of shared drives to compute blades in the system of FIG. 2.

FIG. 3 is a diagram that depicts the distribution and partitioning of drives across the blades $310_1$ through $310_n$ of a system. The drives of FIG. 3 are separated into two arrays. A first set of drives $370a_1$ through $370a_m$ are included in a first array, and a second set of drives $370b_1$ through $370b_m$ are included in a second array. As indicated by the arrows, each blade is associated with a stripe of data in the first array and a stripe of data in the second array. Considered on a collective basis, each blade is associated with a set of drives that are arranged in a 0+1 RAID configuration. The content on each array is a mirror of the content on the other array.

Figure 4:
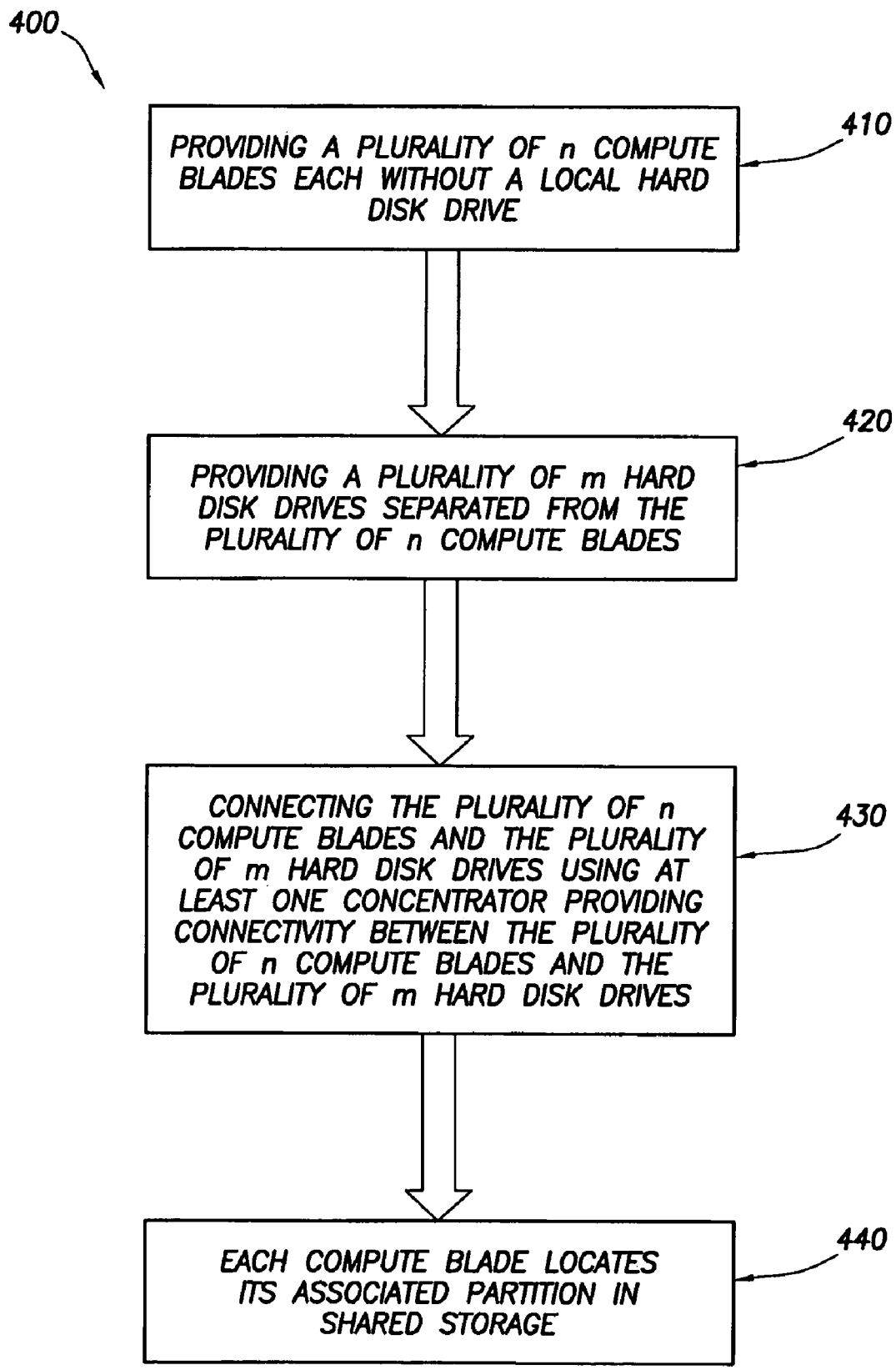
FIG. 4 a flow diagram of a method for providing a host-based RAID solution in a shared storage environment.

FIG. 4 is a flow diagram of a method 400 for providing a host-based RAID solution in a shared storage environment, such as the environment shown in FIGS. 1-3. At step 410, a plurality of n compute blades, each not having a local hard drive, are provided. At step 420, a plurality of m hard drives are provided. These hard drives are remote from the compute blades. At step 430, the compute blades are communicatively coupled to the remote drives through at least one concentrator. At startup, each compute blade locates its partition in each of the arrays. Each compute blade may locate its partition on the basis of its slot number, for example. At step 440 of FIG. 4, the host bus adapter of each compute blade identifies the partition of shared storage that is associated with the compute blade. In operation, the host bus adapter could perform this identification step by identifying the slot associated with the compute blade. The slot number could then be used as an identifier for the partition in shared storage that is associated with the compute blade. Other methodologies could be employed as well to identify the partition associated with each compute blade.

The system and method disclosed herein provides for the migration of the local drives of a compute blade from the compute blade itself to a remote storage resource that is shared by each of the compute blades of the system. Each compute blade uses the dedicated array partitions as though those partitions were local storage with respect to the blade. Each blade is configured so that each is aware of and does not disturb the partitions dedicated to other compute blades of the system. If a failure in a drive in one of the arrays were to occur, the RAID management software in each of the compute blades would manage the rebuild process. As a result, a local RAID solution can be used by multiple compute blades in a shared storage device. In one embodiment, the partition would be rebuilt in the according to the slot number of the associated compute blade, with the lowest partition associated with the lowest slot number being rebuilt first.

Although the system and method disclosed herein has been described with respect to the SAS storage interface, the system and method disclosed herein could be implemented with any other suitable storage interface. Although various illustrative embodiments of the present invention and their advantages are described in detail, a person skilled in the art having the benefit of the present disclosure could make various alterations, additions, and/or omissions without departing from the spirit and scope of the present invention, as defined by the appended claims.

What is claimed is:

1. A system for a host-based RAID solution in a shared storage environment, the system comprising:

a plurality of compute blades wherein each compute blade lacks a local drive and comprises at least one storage interface;

a plurality of drives separated from the plurality of compute blades, wherein the plurality of drives further comprise a plurality of striped partitions; and at least one concentrator for providing connectivity between each of the plurality of compute blades and the plurality of drives, wherein each compute blade is associated with and controls at least one striped partition and each compute blade is aware of the plurality of striped partitions.

2. The system of claim 1, wherein the number of compute blades is greater than the number of drives.

3. The system of claim 1, wherein the number of drives is at least two.

4. The system of claim 1, wherein the host-based RAID solution is capable of executing a RAID function in each of the plurality of striped partitions.

5. The system of claim 4, wherein the host-based RAID solution is capable of being aware of each of the compute blades.

6. The system of claim 1, wherein the host-based RAID solution comprises at least one of an operating system-based internal RAID design, a driver-based internal RAID design, an input/output controller-based internal RAID design, and an input/output processor-based internal RAID design.

7. The system of claim 1, wherein the host-based RAID solution is capable of configuring the plurality of drives as a RAID volume that includes mirroring between at least two of the drives of the RAID volume.

8. The system of claim 7, wherein the RAID volume is capable of being split into a plurality of partitions.

9. A system for a host-based RAID solution in a shared storage environment, the system comprising:

a plurality of compute blades wherein each compute blade lacks a local drive and comprises at least one storage interface;

a first plurality of drives separated from the plurality of compute blades, wherein the first plurality of drives further comprise a first plurality of striped partitions;

a second plurality of drives separated from the plurality of compute blades, wherein the second plurality of drives further comprise a second plurality of striped partitions;

a first concentrator for providing connectivity between each of the plurality of compute blades and each of the first plurality of drives, wherein each compute blade is associated with and controls at least one striped partition of the first plurality of drives and each compute blade is aware of the other striped partition in the first plurality of striped partitions;

a second concentrator for providing connectivity between each of the plurality of compute blades and each of the second plurality of drives, wherein each compute blade is associated with and controls at least one striped partition of the second plurality of drives and each compute blade is aware of the other striped partition in the second plurality of striped partitions.

10. The system of claim 9, wherein the number of compute blades is greater than the number of drives included in each of the first plurality of drives and the second plurality of drives.

11. The system of claim 9, wherein the number of drives is at least two.

12. The system of claim 9, wherein the host-based RAID solution is capable of executing a RAID function in each of the plurality of compute blades.

13. The system of claim 12, wherein the host-based RAID solution is capable of being aware of each of the compute blades.

14. The system of claim 9, wherein the host-based RAID solution comprises at least one of an operating system-based internal RAID design, a driver-based internal RAID design, an input/output controller-based internal RAID design, and an input/output processor-based internal RAID design.

15. The system of claim 9, wherein the host-based RAID solution is capable of configuring at least one of the first plurality of drives and the second plurality of drives as a RAID volume that includes mirroring between at least two of the drives of the RAID volume.

16. The system of claim 15, wherein the RAID 0+1 volume is capable of being split into a plurality of partitions.

17. A method for providing a host-based RAID solution in a shared storage environment, the method comprising:

providing a plurality of compute blades wherein each compute blade lacks a local drive and comprises at least one storage interface;

providing a plurality of drives separated from the plurality of compute blades, wherein the plurality of drives further comprise a plurality of striped partitions; and connecting the plurality of compute blades and the plurality of drives using at least one concentrator for providing connectivity between each of the plurality of compute blades and each of the plurality of drives, wherein each compute blade is associated with and controls at least one of the plurality of striped partitions and each compute blade is aware of the other striped partitions in the plurality of striped partitions.

18. The method of claim 17, wherein the number of compute blades is greater than the number of drives.

19. The method of claim 17, the number of drives is at least two.

20. The method of claim 17, wherein the host-based RAID solution executes a RAID function in all of the compute blades, is capable of being aware of each of the compute blades, comprises at least one of an operating system-based internal RAID design, a driver-based internal RAID design, an input/output controller-based internal RAID design, and an input/output processor-based internal RAID design, and configures the plurality of drives as a RAID volume that includes mirroring between at least two of the drives of the RAID volume, wherein the RAID volume is capable of being split into a plurality of partitions, and at least one of a powering-on of the at least one of the plurality of compute blades and a hot-plugging of the at least one of the plurality of compute blades, the host-based RAID solution locates respective partition information using a respective slot number and takes ownership of a storage resource corresponding to the respective partition of the plurality of partitions.

* * * * *